(12) United States Patent
Kang et al.

(10) Patent No.: US 7,009,813 B2
(45) Date of Patent: Mar. 7, 2006

(54) APPARATUS AND METHOD OF CONFIGURING THE AIR BEARING SURFACES OF SLIDERS IN DISK DRIVES FOR PRODUCING HIGH TEMPERATURES IN THERMALLY-ASSISTED RECORDINGS

(75) Inventors: Soo-Choon Kang, San Jose, CA (US); Chie C. Poon, San Jose, CA (US); Hemantha K. Wickramasinghe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 282 days.

(21) Appl. No.: 10/429,320

(22) Filed: May 5, 2003

(65) Prior Publication Data

US 2004/0223249 A1    Nov. 11, 2004

(51) Int. Cl.
*G11B 5/60* (2006.01)
(52) U.S. Cl. .................. 360/235.7; 360/235.8
(58) Field of Classification Search ............ 360/235.7, 360/235.8, 236.3, 236.5, 236.6, 237
See application file for complete search history.

(56) References Cited

U.S. PATENT DOCUMENTS

| 6,233,118 | B1 * | 5/2001 | Boutaghou et al. ......... 360/237 |
| 6,288,981 | B1 | 9/2001 | Yoshida et al. |
| 6,317,280 | B1 | 11/2001 | Nakajima et al. |
| 6,462,909 | B1 * | 10/2002 | Boutaghou et al. ...... 360/235.8 |

* cited by examiner

*Primary Examiner*—Robert S. Tupper
(74) *Attorney, Agent, or Firm*—Bracewell & Giuliani LLF (57) ABSTRACT

A hard disk drive slider has an air bearing surface that uses the ambient air in the disk drive as a heat source for thermal-assisted recording. Incoming air between the slider and the disk surface is pressurized to produce heat sufficient to heat the recording media. A very small thermal pad is located at the trailing end of the air bearing surface and wraps around the magnetic recording head. The thermal pad includes small pockets to contain the heated air to provide heat to the recording media. The air can be pressurized to approximately 80 atm, which is sufficient to raise the air temperature to approximately 800 degrees C. at isentropic conditions. The heated air transfers the heat energy to the recording media by conduction to elevate a disk recording layer temperature for thermomagnetic recording.

14 Claims, 5 Drawing Sheets

APPARATUS AND METHOD OF CONFIGURING THE AIR BEARING SURFACES OF SLIDERS IN DISK DRIVES FOR PRODUCING HIGH TEMPERATURES IN THERMALLY-ASSISTED RECORDINGS

BACKGROUND OF THE INVENTION

1. Technical Field

The present invention relates in general to an improved air bearing surface for disk drive sliders, and in particular to an improved apparatus and method of configuring the air bearing surfaces of disk drive sliders in order to produce high temperatures on the surfaces of the disks during thermally-assisted recordings

2. Description of the Related Art

Generally, a data access and storage system consists of one or more Storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions, or so called air bearing surface (ABS) on its body that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

There have been many successful attempts to increase the performance of disk drives. One apparatus and method for improving disk drives employs thermomagnetic recording technology. See U.S. Pat. No. 6,317,280 to Nakajima, et al. In that patent, a recording and reproducing head includes a floating slider, a heating head, a reproduction-use magnetic head as an MR head, and a recording-use magnetic head as a thin-film inductive head mounted on the floating slider. The heating section of the heating head has a width that is narrower than the widths of the reproduction-use magnetic head and recording-use magnetic head. In the recording layer of the disk, the coercive force of the recording layer at a recording temperature and saturation magnetization thereof at a reproduction temperature are adjusted, and the compensation temperature of the recording layer is adjusted to be substantially room temperature. The thermomagnetic recording and reproducing head can realize a narrow track without decreasing the widths of the recording-use magnetic head and reproduction-use magnetic head, thereby increasing the track density.

Still other prior art thermomagnetic recording technology utilize laser optical devices (see, e.g., U.S. Pat. No. 6,288,981 to Yoshida, et al.) to provide a heat source. Although these devices are workable, they make the head structure complex and relatively expensive. Thus, an improved apparatus and method of providing a source of heat to be utilized in thermomagnetic recording in order to produce high temperatures on the surfaces of the disks during thermally-assisted recordings would be desirable.

SUMMARY OF THE INVENTION

One embodiment of a hard disk drive slider has an air bearing surface that uses the ambient air in the disk drive as a heat source for thermally-assisted recording purposes. By optimizing the air bearing shape, incoming air between the slider and the disk surface is pressurized to produce air that is hot enough to heat the recording media on the disk. No additional devices or processes, such as a prior art heater embedded in a slider, are required to achieve the desired results. Thus, the present invention is compatible with existing head structures.

A very small thermal pad is located at the trailing end of the air bearing surface and wraps around the magnetic recording head structure. The thermal pads can be processed using ion etching or carbon deposition processes, and includes small pockets to contain the heated air in order to provide heat to the recording media on the disk. The air can be pressurized to approximately 80 atm at less than 10 nm fly height, which is sufficient to raise the air temperature up to approximately 800 degrees C. or more at isentropic conditions. The heated air transfers the heat energy to the recording media by conduction to elevate a disk surface temperature for thermomagnetic recording.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments

DETAILED DESCRIPTION OF A PREFERRED EMBODIMENT

Figure 1:
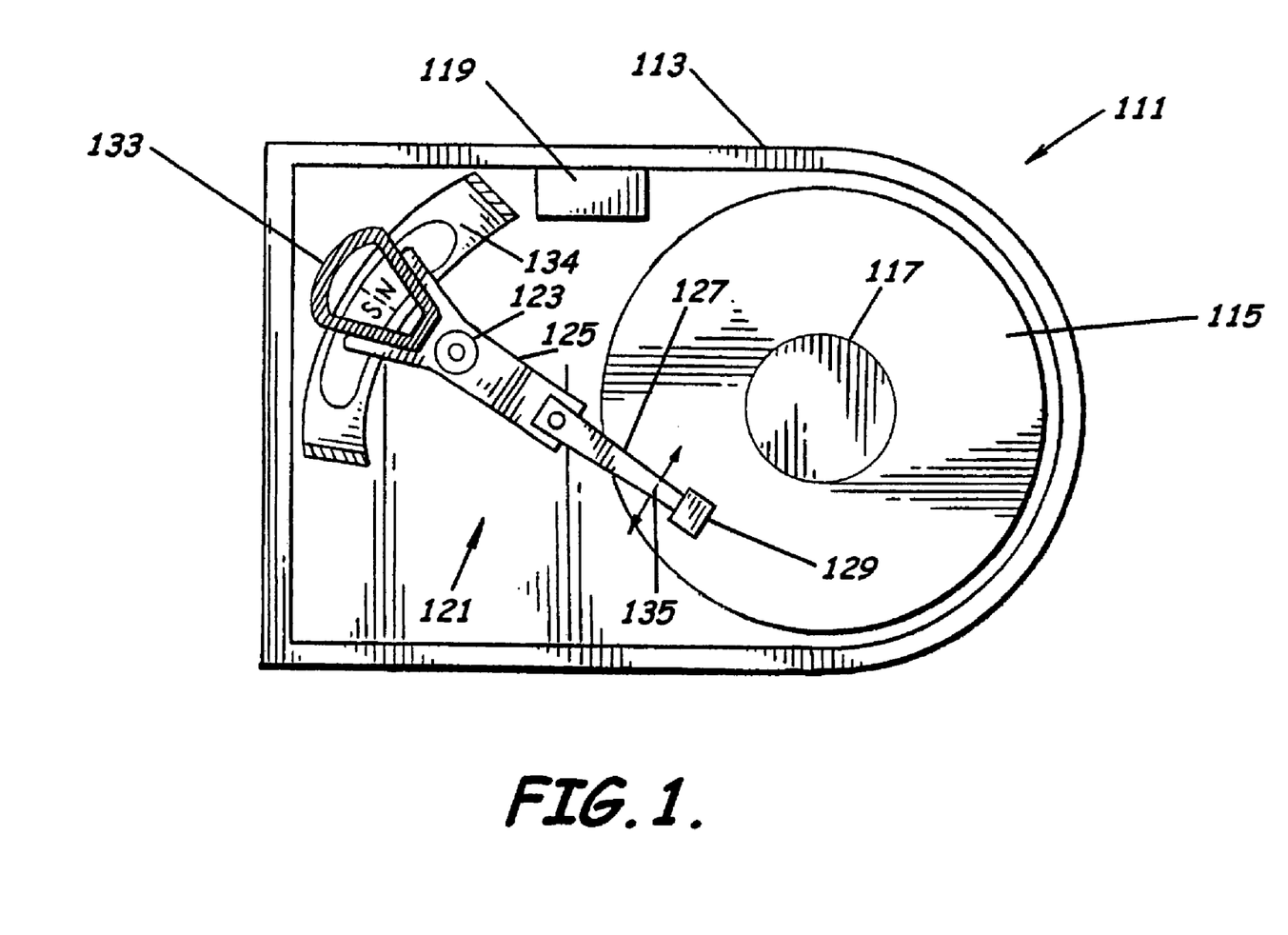
FIG. 1 is a schematic top plan view of one embodiment of a hard disk drive constructed in accordance with the present invention.

Referring to FIG. 1, a schematic drawing of one embodiment of an information storage system or data recording device comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered integrated lead suspension 127. A magnetic read/write transducer or head is mounted on a slider 129 and secured to a flexure that is flexibly mounted to each integrated lead suspension 127. The read/write heads magnetically read data from and/or magnetically write data to disks 115. The level of integration called the head gimbal assembly is the head and the slider 129, which are mounted on integrated lead suspension 127. The slider 129 is usually bonded to the end of integrated lead suspension 127. In the embodiment shown, the head may be pico size (approximately 1250×1000×300 microns) and formed from ceramic or intermetallic materials. The head also may be nano size (approximately 2050×1600×450 microns), or femto size (approximately 850×700×230 microns). The slider 129 is pre-loaded against the surface of disk 115 (preferably in the range two to ten grams) by integrated lead suspension 127.

Integrated lead suspensions 127 have a spring-like quality which biases or urges the air bearing surface (ABS) of slider 129 against the disk 115 to enable the creation of the air bearing film between the slider 129 and the surface of disk 115. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the sliders 129 of the head gimbal assemblies radially across tracks on the disks 115 until the heads settle on the target tracks. The head gimbal assemblies operate in a conventional manner and always move in unison with one another, unless drive 111 uses multiple independent actuators (not shown) wherein the arms 125 can move independently of one another.

There are several parameters that measure the performance of the slider 129. Fly height is the separation between a point on the ABS of the slider 129 and the surface of disk 115, such as the center of the trailing edge of the ABS and the surface of disk 115. Pitch is the tilting of the flying slider 129 in the longitudinal direction with respect to the plane of disk 115. Roll is the tilting of the flying slider 129 in the lateral or transverse direction with respect to the plane of the disk 115. Fly height, pitch, and roll are all dependent on parameters like ambient pressure, temperature, air viscosity, linear velocity (product of radius from center of the disk and disk angular velocity or rpm), skew angle (angle between the longitudinal axis of the slider and the tangent to the current radius from the center of the disk), pre-load (the force applied by, for example, the suspension), suspension moments (moments applied in the pitch and roll directions by the suspension), slider flatness, and the design of the slider ABS itself. The design of the slider 129 targets a low velocity and low skew dependent, fly height profile that remains substantially flat across the radius of the disk 115. The spacing between the head and the disk is described by fly height, together with its pitch and roll.

Figures 8, 9:
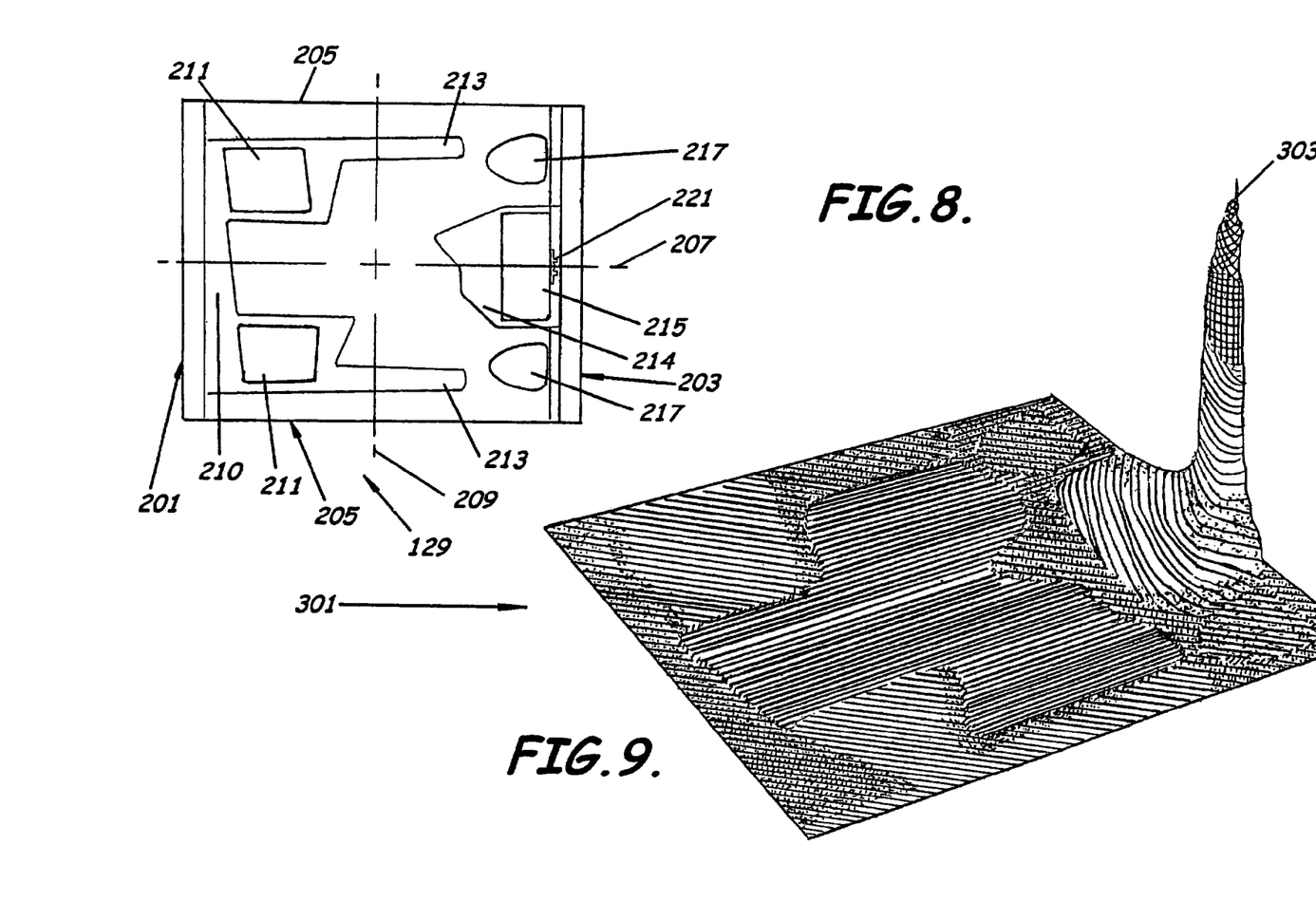
FIG. 8 is a plan view of the air bearing surface of a slider utilizing the feature of FIGS. 2 and 3 and is constructed in accordance with the invention.
FIG. 9 is a three-dimensional, isometric plot of the pressure generated by the air bearing surface of FIG. 8 during operation.

Referring now to FIG. 8, an illustrative example of an air bearing or ABS for the slider 129 is shown. For reference purposes, the slider 129 has a leading edge or end 201, a trailing end 203, and side edges 205, a longitudinal or x-axis 207, a lateral or y-axis 209, and a z-axis (into and out of the page). Typically, the slider 129 is made by more than one etching process that produces multiple depth level formations, including the ABS surface, and shallow depth pad on an x-y-plane surface of the base structure of slider 129. In this particular version of slider 129, the ABS has a plurality of air bearing pads including a leading end pads 211 and a central trailing end pad 215. The shallow depth surface has a front step 210, side rails 213, a rear step 214, and lateral trailing end pads 217. However, in no way is the slider of the present invention limited or restricted to this configuration; it is merely shown as one example. Moreover, any combination of these components may be altered depending on the application for the slider.

The key element of the present invention is a very small formation 221 which, in the embodiment shown, is located adjacent to the trailing end 203 of slider 129. Formation 221 may comprise many different configurations, three of which are illustrated in the magnified view of FIGS. 2–7. In the three configurations of FIGS. 2–7, other components of the ABS, such as the detail of air bearing pads, are not shown in order to focus on the various designs of the formation 221. In one embodiment, the formation 221 in the air bearing is located on one of the air bearing pads (i.e., the central trailing end pad 215, in FIG. 8), and is adjacent to the trailing end 203 of the base.

Figure 2:
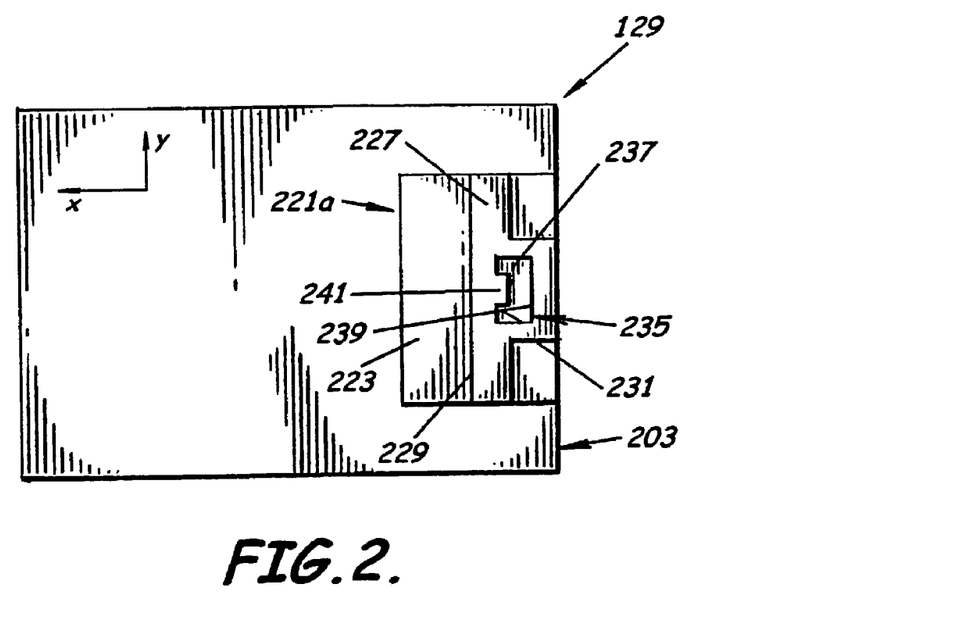
FIG. 2 is a plan view of one embodiment of a feature on an air bearing surface utilized by the drive of FIG. 1 for producing high temperatures on the surface of a disk and is constructed in accordance with the invention.
Figure 3:
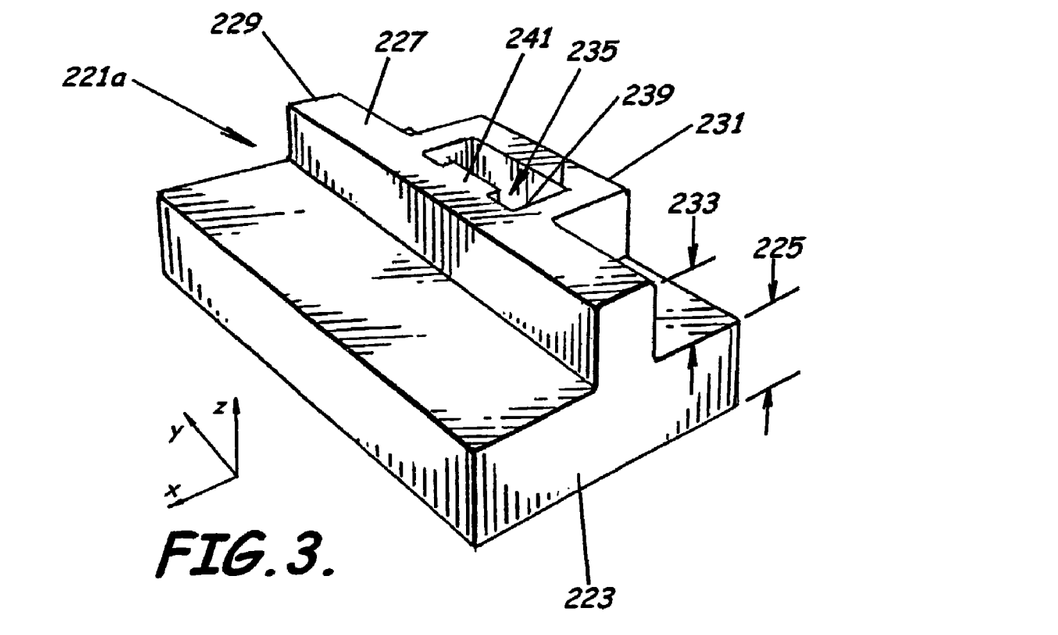
FIG. 3 is an isometric view of the feature of FIG. 2 and is constructed in accordance with the invention.

A first example of the formation 221 is illustrated in FIGS. 2 and 3 as formation 221a. In this version, the formation 221a has a first feature 223 which is a simplified ABS surface of a rectangular block. First feature 223 has a first height 225 in the z-direction (FIG. 3). Formation 221 also has a second feature 227 on the first feature 223 which, in the embodiment shown, is T-shaped including a cross-bar 229 and a central portion or body 231. Cross-bar 229 extends laterally across first feature 223 in the y-direction, and the body 231 extends longitudinally across first feature 223 in the x-direction toward the trailing end 203. The second feature 227 has a second height 233 in the z-direction that is greater than the first height 225. A generally C-shaped opening or hole 235 (e.g., blind hole 235) is located in the second feature 227 and has a depth in the z-direction defined by a bottom 237 (FIG. 2). Blind hole 235 has a plurality of sides or side walls 239 extending in the z-direction such that the blind hole 235 is surrounded on all of the plurality of sides 239 by the second feature 227.

The plane contains the read write head 241 is mounted in the second feature 227 of the formation 221a adjacent to the blind hole 235. In the version shown, the bottom 237 of the blind hole 235 is located at a same level in the z-direction as the first height 225 of the first feature 223. In this version the head 241 also extends into the blind hole 235 in the x-direction toward the trailing end 203 of the base to give the blind hole 235 its C-shape. The head 241 is located at the second height 233 of the second feature 227 of the formation 221a such that the head 241 is substantially flush with the second height 233 in the z-direction, as shown. The head 241 and the blind hole 235 are centered on the second feature 227 in the y-direction, and the formation 221a is centered on the air bearing in the y-direction.

The present invention may be formed, for example, by reactive ion etching shallow depth surface of the slider 129, forming the air bearing including the first feature 223 of the formation 221a by ion milling, and forming the second feature 227 and the blind hole 235 by ion milling-liquid resist. Another alternative to fabricating the formation 221a is to use a super shallow etching process to form the second feature 227 and the blind hole 235. The formation 221 also may be formed from a carbon deposition process. In one version, the depth (z-dimension) of the blind hole 235 is on the order of approximately 5 to 30 nm, and its x-and-y-dimensions are approximately 40 $\mu$m×150 $\mu$m.

Figure 4:
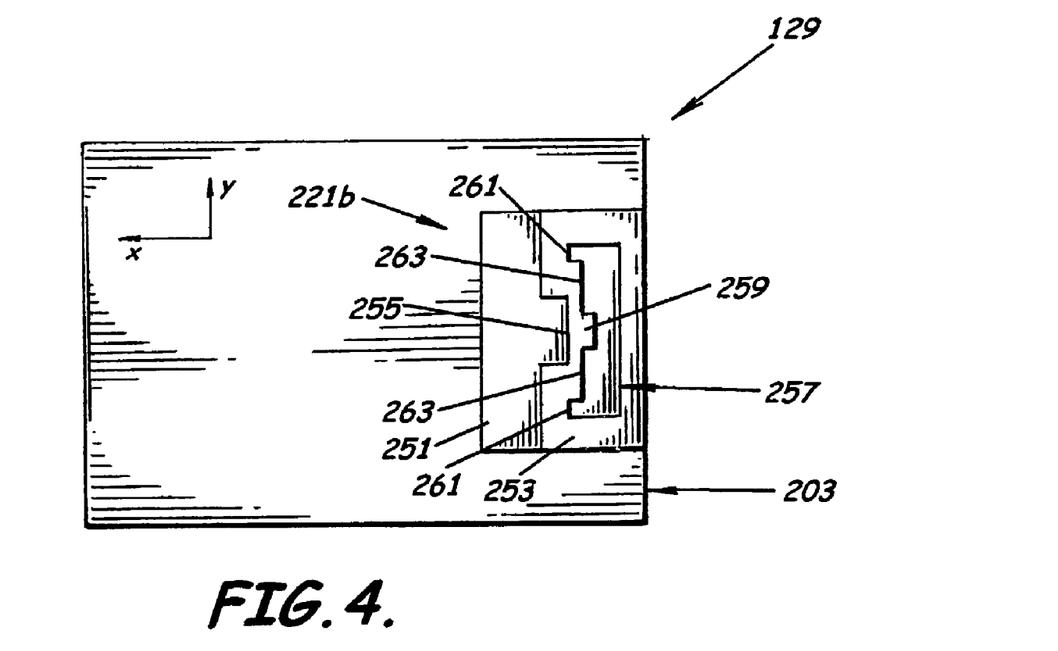
FIG. 4 is a plan view of an alternate embodiment of a feature on an air bearing surface utilized by the drive of FIG. 1 for producing high temperatures on the surface of a disk and is constructed in accordance with the invention.
Figure 5:
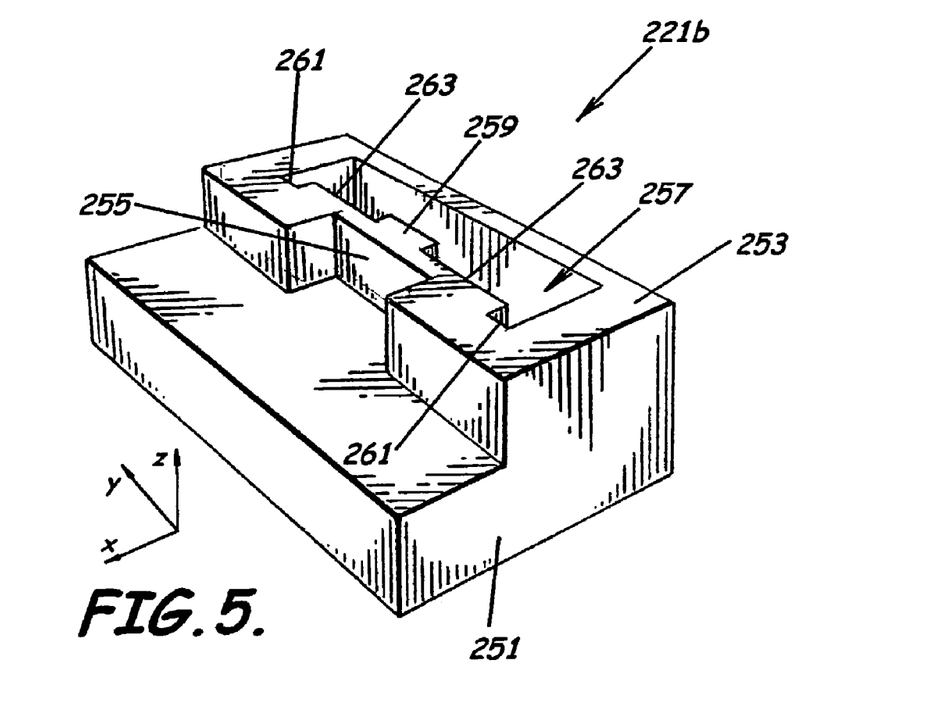
FIG. 5 is an isometric view of the feature of FIG. 4 and is constructed in accordance with the invention.

Another example of the present invention is depicted in FIGS. 4 and 5 as a formation 221b. In this version of the formation, a number of similar components are present and the first feature 251 is substantially identical to the previous first feature 223 of the preceding example. However, the second feature 253 and the blind hole 257 differ in shape from their respective predecessors. The second feature 253 of formation 221b is generally C-shaped with a recess 255 located opposite the trailing end 203. The blind hole 257 is elongated in the y-direction and has a central portion 259 (which contains the head), lateral ends 261, and two medial portions 263 located between the central portion 259 and the lateral ends 261. The lateral ends 261 have an x-axis dimension that is greater than a x-axis dimension of the medial portions 263, and the x-axis dimension of the medial portions 263 is greater than a x-axis dimension of the central portion 259. The depth (z-dimension) of the blind hold 257 is on the order of approximately 5 to 30 nm, and its x and y dimensions are approximately 40 $\mu$m×150 $\mu$m.

Figure 6:
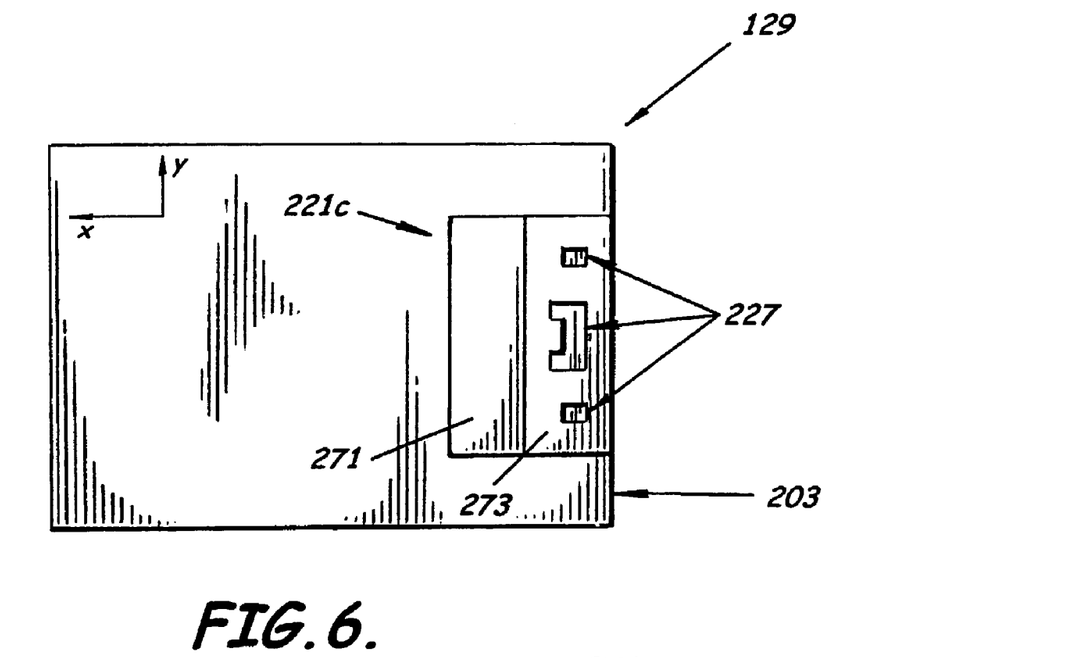
FIG. 6 is a plan view of another alternate embodiment of a feature on an air bearing surface utilized by the drive of FIG. 1 for producing high temperatures on the surface of a disk and is constructed in accordance with the invention.
Figure 7:
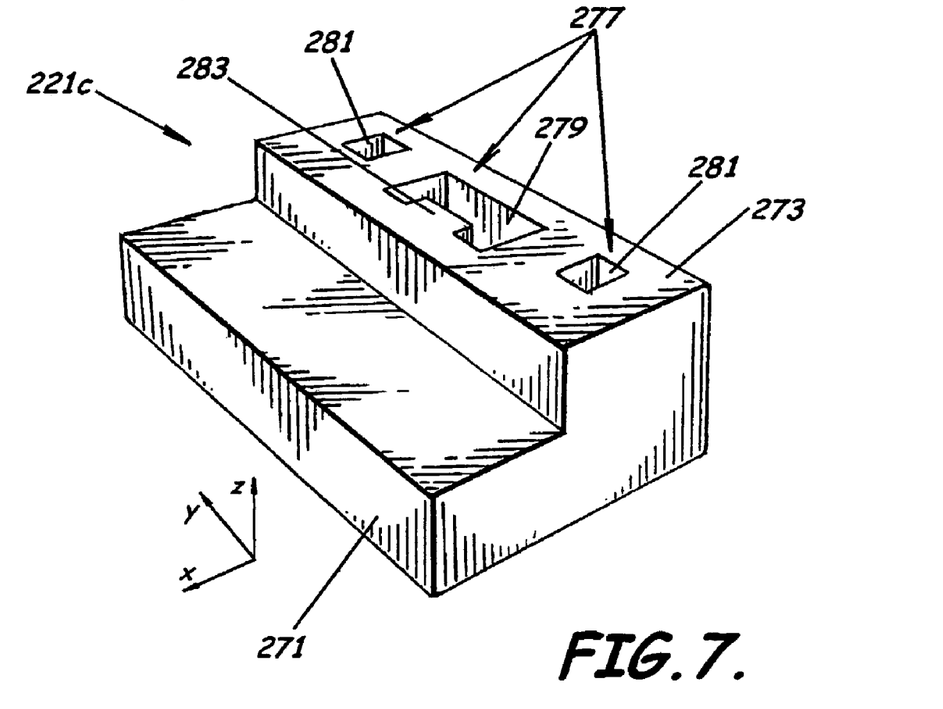
FIG. 7 is an isometric view of the feature of FIG. 6 and is constructed in accordance with the invention.

Yet another example of the present invention is depicted in FIGS. 6 and 7 as a formation 221c. In this version of the formation, the first feature 271 resembles its predecessors but the second feature 273 and the blind hole 277 differ in shape from their respective predecessors. The second feature 273 of the formation 221c is rectangular in shape and located on the first feature 271. The blind hole 277 actually comprises three blind holes that are spaced apart from each other and symmetrically arranged in the y-direction. The three blind holes comprise a central, C-shaped blind hole 279 and two lateral blind holes 281 that are rectangular in shape. The head 283 extends into the central blind hole 279 toward the trailing end 203 to define the C-shape. The depth (z-dimension) of the blind hold 257 is on the order of approximately 5 to 30 nm, and its x and y dimensions are approximately 40 $\mu$m×150 $\mu$m.

In operation, the present invention is utilized in a method of thermomagnetic recording in a data storage device. The method comprises providing a data storage device 111 (FIG. 1) having a rotatable disk 115 with tracks and an actuator 121 having a slider 129 with a head 241 (FIG. 2) for reading data from and writing data to the tracks on the disk 115. An air bearing is fabricated on the slider 129. The air bearing has a formation (e.g., 221a of FIGS. 2 and 3) with a hole 235 formed therein such that the head 241 is located in the formation 221a adjacent to the hole 235. The disk 115 is rotated relative to the actuator 121 and the slider 129 is positioned over a track on the disk 129 at a fly height.

The method of the present invention comprises compressing air in the hole 235 in the formation 221a as the disk 115 rotates adjacent to the slider 129 while the slider 129 is at the fly height. In this way, the compressed air reaches a desired pressure just in front of the head 241 and is thereby heated to a desired temperature entirely by compression heating. The hole 235 restrains the high pressure region to a tight bundle precisely at the write pole of the head 241. The high pressure air bundle is approximately 20 $\mu$m×15 $\mu$m and is located at the write poles. A three-dimensional, isometric plot 301 of the pressure generated by the hole in the formation of the air bearing surface (of FIG. 8) is depicted in FIG. 9. The "spike" 303 of pressure located along the center of the trailing edge represents the high pressure bundle generated near the hole in the formation.

The air in the hole 235 can be pressurized to approximately 80 atm, which is about three times greater than the pressure generated by a conventional ABS. This level of pressure is sufficient to raise the air temperature up to approximately 800 degrees C. or more at isentropic conditions. The heated air transfers the heat energy to the recording media (the tracks on the disk 115) by conduction to elevate a disk surface temperature for thermomagnetic recording. In this way the method of the present invention heats a portion of the track adjacent to the hole 235 in the slider 129 to a sufficient temperature with the compression-heated air as the disk 115 rotates to enable thermomagnetic recording by the head 241 to said portion of the track. The heat transfer from the air bundle to the media is linear with pressure, which lends itself to a higher efficiency for thermal-assisted recordings. The narrow bundle of the high pressure air stream enhances the focusing of the heat path to the media for thermal-assisted recordings. The air pocket also provides heat shielding since the compression-heated air that is trapped in the hole or pocket acts as a heat shroud and thereby reduces heat loss from the heated write poles. This again results in a system and process that has a higher efficiency than prior art designs.

As stated previously, the fabricating step of the method of the present invention also may comprise shaping the slider by reactive ion etching, ion milling the air bearing including a portion (e.g., the first feature) of the formation, and ion milling-liquid resist the hole. The fabricating step may comprise super shallow etching the formation and the hole.

The present invention has many advantages over conventional designs. A hard disk drive slider constructed with an air bearing surface (ABS) of the present invention uses the ambient air in the disk drive as a heat source to produce thermally-assisted recordings. The ABS pressurizes incoming air between the slider and the disk surface to heat air that is hot enough to heat the recording media on the disk. No additional devices or processes, such as a prior art heater embedded in a slider, are required to achieve the desired results. Thus, the present invention is compatible with existing head structures.

The small thermal pad located at the trailing end of the ABS is wrapped around the magnetic recording head. A high pressure region is formed in a tight bundle and precisely located at the write pole of the head. The thermal pads can be processed using carbon deposition processes or super shallow etching processes. With the latter process, no deposition is needed. The pads include small pockets to contain the heated air in order to provide heat to the recording media on the disk. The air can be pressurized up to approximately 80 atm, which is approximately triple the pressure created by conventional ABS. This pressure is sufficient to raise the air temperature up to approximately 800 degrees C. at isentropic conditions. The heated air transfers the heat energy to the recording media by conduction to elevate a disk surface temperature for thermomagnetic recording. The present invention uses compressed air as a potential heat source, and optimizes the ABS shape to maximize air compression. The thermal or air pocket holds the hot air to provide heat to the sensor. Since the heat transfer is linear with pressure, the thermal-assisted recording takes place at a higher efficiency. Moreover, the air pocket provides heat shielding as the compression-heated air trapped in the pocket acts as a heat shroud and reduces heat loss from heated write poles.

While the invention has been shown or described in only some of its forms, it should be apparent to those skilled in the art that it is not so limited, but is susceptible to various changes without departing from the scope of the invention. For example, the present invention may be employed on other types of data recording device besides those described herein.

What is claimed is:

1. A slider, comprising:
a base having an x-axis, a y-axis, a z-axis, a trailing end, and a surface in an x-y-plane, and each of the axes defining x, y, and z-directions, respectively;
an air bearing formed on the surface of the base;
a formation in the air bearing, the formation having a height in the z-direction, a hole located in the formation and extending toward the surface of the base at a depth in the z-direction;
a head for reading and writing data, the head being mounted in the formation adjacent to the hole in the formation; and
the head extends into the hole in the x-direction toward the trailing end of the base and is located at the height of the formation such that the head is substantially flush with the formation in the z-direction.

2. The slider of claim 1, wherein the head and the hole are centered on the formation in the y-direction, and wherein the formation is centered on the air bearing in the y-direction.

3. A slider, comprising:
a base having an x-axis, a y-axis, a z-axis, a trailing end, and a surface in an x-y-plane, and each of the axes defining x, y, and z-directions, respectively;
an air bearing formed on the surface of the base;
a formation in the air bearing, the formation having a height in the z-direction, a hole located in the formation and extending toward the surface of the base at a depth in the z-direction;
a head for reading and writing data, the head being mounted in the formation adjacent to the hole in the formation; and
the hole has a plurality of sides extending in the z-direction and is walled off such that the hole is surrounded on all of the plurality of sides by the formation.

4. The slider of claim 1, wherein the hole is a blind hole having a bottom defined by the hole being closed in the z-direction nearest the surface of the base, and the hole being open in the z-direction opposite the bottom.

5. The slider of claim 1, wherein a shallow depth of the air bearing is formed by reactive ion etching, a portion of the formation is formed by ion milling, and the hole is formed by ion milling-liquid resist.

6. The slider of claim 1, wherein the formation and the hole are formed by a process selected from the group consisting of a super shallow etching process and a carbon deposition process.

7. The slider of claim 1, wherein the air bearing has a plurality of air bearing pads, and the formation is located on one of the air bearing pads adjacent to the trailing end of the surface of the base.

8. A data recording device, comprising in combination:
a housing having a disk mounted and rotatable thereto, and an actuator mounted to and pivotable relative to the housing and the disk, and a slider mounted to the actuator, the slider having a head for reading data from and writing data to the disk; the slider further comprising:
a base having an x-axis, a y-axis, a z-axis, a trailing end, and a surface in an x-y-plane, and each of the axes defining x, y, and z-directions, respectively;
an air bearing formed on the surface of the base, the air bearing having a plurality of air bearing pads;
a formation in the air bearing located on one of the air bearing pads adjacent to the trailing end of the base, the formation having a first feature with a first height in the z-direction, a second feature on the first feature and having a second height in the z-direction that is greater than the first height, and a blind hole located in the second feature and having a depth in the z-direction defined by a bottom, a plurality of sides extending in the z-direction such that the blind hole is surrounded on all of the plurality of sides by the second feature; and
the head is mounted in the second feature of the formation adjacent to the blind hole.

9. The data recording device of claim 8, wherein the bottom of the blind hole is located at a same level in the z-direction as the first height of the first feature.

10. The data recording device of claim 8, wherein the head extends into the blind hole in the x-direction toward the trailing end of the base, and is located at the second height of the second feature of the formation such that the head is substantially flush with the second height in the z-direction.

11. The data recording device of claim 8, wherein the head and the blind hole are centered on the second feature of the formation in the y-direction, and wherein the formation is centered on the air bearing in the y-direction.

12. The data recording device of claim 8, wherein a shallow depth of the air bearing is formed by reactive ion etching, the first feature of the formation is formed by ion milling, and the second feature and the blind hole are formed by ion milling-liquid resist.

13. The data recording device of claim 8, wherein the formation and the blind hole are formed by a process selected from a group consisting of a super shallow etching process and a carbon deposition process.

14. The data recording device of claim 8, wherein the head extends into the blind hole toward the trailing end to define a C-shape for the blind hole, and the second feature of the formation is generally T-shaped with a body extending toward the trailing end and a cross-bar.

* * * * *